United States Patent
Kim et al.

(10) Patent No.: US 10,044,838 B2
(45) Date of Patent: Aug. 7, 2018

(54) METHOD OF AUTOMATICALLY SETTING PROTOCOL IN PROGRAMMABLE LOGIC CONTROLLER SYSTEM

(71) Applicant: LSIS CO., LTD., Gyeonggi-do (KR)

(72) Inventors: Ki-Myung Kim, Gyeonggi-do (KR); Geon Yoon, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 227 days.

(21) Appl. No.: 15/098,271

(22) Filed: Apr. 13, 2016

(65) Prior Publication Data

US 2016/0309005 A1    Oct. 20, 2016

(30) Foreign Application Priority Data

Apr. 14, 2015  (KR) .......................... 10-2015-0052600

(51) Int. Cl.
*H04L 29/06* (2006.01)
*H04L 12/40* (2006.01)

(52) U.S. Cl.
CPC .............. *H04L 69/18* (2013.01); *H04L 67/42* (2013.01); *H04L 2012/4026* (2013.01)

(58) Field of Classification Search
CPC .............. H04L 41/0803; H04L 41/0806; H04L 41/0876; H04L 41/0886; H04L 41/0889; H04L 67/42; H04L 69/18; H04L 2012/4026
See application file for complete search history.

(56) References Cited

U.S. PATENT DOCUMENTS

| | | | |
|---|---|---|---|
| 6,678,751 B1 * | 1/2004 | Hays | H04L 25/0262 709/217 |
| 6,826,669 B1 | 11/2004 | Le et al. | |
| 6,867,749 B1 * | 3/2005 | Il | G05B 19/0421 345/1.1 |

(Continued)

FOREIGN PATENT DOCUMENTS

| | | |
|---|---|---|
| JP | 2000-49891 A | 2/2000 |
| JP | 2001-273098 A | 10/2001 |

(Continued)

OTHER PUBLICATIONS

European Search Reports dated Sep. 13, 2016 corresponding to application No. 16161373.2-1802.

(Continued)

*Primary Examiner* — Vivek Srivastava
*Assistant Examiner* — William C McBeth
(74) *Attorney, Agent, or Firm* — K&L Gates LLP

(57) ABSTRACT

In some embodiments, a method of automatically setting a protocol is performed in a protocol automatic setting server communicating with a client in a Programmable Logic Controller (PLC) system. The method can include receiving a request frame from a client; analyzing a protocol of the request frame based on a protocol stack and determining a response frame corresponding to the request frame according to an analysis result; and transmitting the response frame to the client. The server can automatically analyze a request frame from the client based on the protocol stack, and thus conventional protocol presetting can be eliminated.

6 Claims, 9 Drawing Sheets

(56) References Cited

U.S. PATENT DOCUMENTS

| | | | |
|---|---|---|---|
| 6,880,015 B1* | 4/2005 | Siders | H04L 29/06 370/464 |
| 6,907,460 B2 | 6/2005 | Logunov et al. | |
| 7,529,293 B2* | 5/2009 | Lochner | G08C 19/02 375/222 |
| 8,068,474 B2 | 11/2011 | Ferguson et al. | |
| 9,141,597 B2 | 9/2015 | Auffray et al. | |
| 2002/0166071 A1* | 11/2002 | Lingafelt | H04L 63/1408 726/14 |
| 2002/0191640 A1* | 12/2002 | Haymes | H04J 3/0602 370/466 |
| 2003/0056043 A1 | 3/2003 | Kostadinov | |
| 2004/0015572 A1 | 1/2004 | Kang | |
| 2004/0125752 A1* | 7/2004 | Hurst | H04L 29/06 370/252 |
| 2004/0131014 A1 | 7/2004 | Thompson et al. | |
| 2005/0005022 A1* | 1/2005 | Taylor | H04L 29/06 709/236 |
| 2005/0005306 A1 | 1/2005 | Kim et al. | |
| 2005/0228509 A1 | 10/2005 | James | |
| 2008/0069067 A1 | 3/2008 | Sood et al. | |
| 2009/0268728 A1* | 10/2009 | Santos | H04L 69/18 370/389 |
| 2012/0105637 A1 | 5/2012 | Yousefi et al. | |
| 2013/0208724 A1* | 8/2013 | Colucci | H04L 41/0816 370/392 |
| 2014/0321443 A1* | 10/2014 | Samudrala | H04J 3/1694 370/337 |
| 2015/0127876 A1* | 5/2015 | Erni | G05B 19/4185 710/315 |
| 2016/0150056 A1* | 5/2016 | Hanusch | H04L 69/18 370/311 |
| 2017/0317915 A1* | 11/2017 | Ritmanich | H04L 43/50 |

FOREIGN PATENT DOCUMENTS

| | | |
|---|---|---|
| JP | 2004-516579 A | 6/2004 |
| JP | 2016-86378 A | 5/2016 |
| KR | 10-2001-0102505 A | 11/2001 |
| KR | 10-2002-0087940 A | 11/2002 |
| KR | 10-2003-0064828 A | 8/2003 |
| KR | 10-2003-0097011 A | 12/2003 |
| KR | 10-2004-0062893 A | 7/2004 |
| KR | 10-2005-0003921 A | 1/2005 |
| KR | 10-2009-0028260 A | 3/2009 |
| KR | 10-2009-0047515 A | 5/2009 |
| KR | 10-2013-0086363 A | 8/2013 |
| WO | 01/50704 A2 | 7/2001 |
| WO | 0150704 A2 | 7/2001 |

OTHER PUBLICATIONS

Japanese Office Action dated Feb. 7, 2017 in corresponding with counterpart Japanese Patent Application.

* cited by examiner

METHOD OF AUTOMATICALLY SETTING PROTOCOL IN PROGRAMMABLE LOGIC CONTROLLER SYSTEM

CROSS-REFERENCE TO RELATED APPLICATIONS

This application claims the priority of Korean Patent Application No. KR 10-2015-0052600 filed on Apr. 14, 2015, in the Korean Intellectual Property Office, which is hereby incorporated by reference in its entirety.

BACKGROUND

Technical Field

The present disclosure relates to a method of automatically setting a protocol of a Programmable Logic Controller (PLC) system.

Description of the Related Art

A server-client system refers to a network architecture consisting of clients and a server that is frequently used in device-to-device communication. In the server-client system, the server performs a function of providing a service and the clients perform a function of consuming a service provided by the server. The clients and the server communicate with one another in such a manner that the clients send requests for a service to the server and the server sends responses to the requests from the clients.

The server may communicate with one client or a plurality of clients. The server supports a single protocol, and one client or a plurality of clients using the protocol supported by the server may access the server.

The clients transmit request frames to the server and the server transmits response frames in response to the request frames from the clients. Hereinafter, a communication process between a server and clients will be described with reference to FIGS. 1 and 2.

In the example shown in FIG. 1, a server and a client communicate with each other. A server 11 supports a single protocol, and a client 12 using the protocol supported by the server 11 accesses the server 11. For example, the server 11 of FIG. 1 may support a protocol A, and the client 12 using the protocol A supported by the server 11 may access the server 11.

The client 12 and the server 11 communicate with each other in such a manner that the client 12 transmits a request frame for a service to the server 11 and the server 11 analyzes the request frame received from the client 12 and transmits a response frame to the client 12. The request frame includes a service such as a data read/write request or a specific service control.

Now, reference is made to FIG. 2 showing an example in which a server communicates with N clients. The server 21 supports a single protocol, and a plurality of clients 22a, 22b, and 22c using the protocol supported by the server 21 access the server 21.

For example, the server 21 of FIG. 2 may support a protocol A, and a first client 22a, a second client 22b, and a third client 22c using the protocol A supported by the server 21 may access the server 21. If the server 21 supports a protocol B instead of the protocol A, the clients using the protocol B may access the server 21.

At least one of the first client 22a, the second client 22b, and the third client 22c transmits a request frame for a service to the server 21, and the server 21 analyzes the request frame received from the at least one client, e.g., the first client 22a and transmits a response frame in response to the request frame to the client 22a. The request frame includes a service such as a data read/write request or a specific service control.

However, in FIGS. 1 and 2, the server supports only a single protocol, and thus only clients using the protocol supported by the server can access the server. When the server-client system attempts to communicate with a client that uses a protocol other than those supported by the server, an additional server for the protocol is required.

For example, in the server-client system shown in FIG. 3A, a first server 31a may support a protocol A, and a first client 32a using the protocol A may access the first server 31a. However, the first server 31a does not support a protocol B, and thus a second client 32b using the protocol B cannot access the first server 31a. Therefore, if the server-client system including the server that supports only a single protocol, i.e., the protocol A, attempts to communicate with a second client 32b, a second server 31b that supports the protocol B is additionally required, as shown in FIG. 3B.

If the server-client system includes a server that supports a plurality of protocols, the server has to set a protocol to be used by a client before communicating with the client. Hereinafter, a process in which a server supporting a plurality of protocols sets a protocol will be described with reference to FIG. 4.

For example, as shown in FIG. 4, when a server 41 supports a plurality of protocols such as a protocol A, a protocol B, a protocol C, and a protocol D, the server 41 has to perform a protocol presetting process of setting the protocol C as the communication protocol before communicating with a client 42 using the protocol C. The protocol presetting process is performed by a manager who previously identifies the protocol C as the communication protocol with the client 42 and inputs the protocol C to the server 41. Only after the presetting process of the protocol C is complete, the server 41 may communicate with the client 42 using the protocol C.

As described above, in the related art, even if a server supporting a plurality of protocols is employed, it is still required to perform presetting processes of different protocols for different clients. Further, the server can support only one protocol after setting of a protocol is completed and until another protocol is reset.

SUMMARY

It is an aspect of some embodiments of the present disclosure to provide a method of automatically setting a protocol of a PLC system that can eliminate conventional protocol presetting, as a server automatically analyzes a request frame from a client based on a protocol stack.

It is another aspect of some embodiments of the present disclosure to provide a method of automatically setting a protocol of a PLC system in which a protocol stack is implemented in software on the server to allow a server to support a variety of protocols, without any additional hardware device. As a result, system construction cost can be reduced.

It is another aspect of some embodiments of the present disclosure to provide a method of automatically setting a protocol of a PLC system by which one server can communicate with a plurality of clients using different protocols such that no additional server for clients using different protocols is required.

The present disclosure is not limited to the above aspects and other aspects of the present disclosure will be clearly understood by those skilled in the art from the following description.

In accordance with one aspect of some embodiments of the present disclosure, a method of automatically setting a protocol, performed in a server communicating with clients in a Programmable Logic Controller (PLC) system, the method comprising: receiving a request frame from a client; analyzing a protocol of the request frame based on a protocol stack to determine a response frame for the request frame according to an analysis result; and transmitting the response frame to the client.

The detailed matters of the embodiments will be included in the detailed description and the accompanying drawings.

Advantages and/or characteristics of the present disclosure and a method of attaining them will become more readily apparent from the detailed description given hereinafter together with the attached drawings. However, the present disclosure is not limited to the following embodiments but will be implemented with various forms, the present embodiments enable to completely disclose the present disclosure and are provided to completely know the scope of the disclosure to those skilled in the art, and the present disclosure is defined by the scope of claims. Like reference numerals designate like elements throughout the specification.

Advantages

According to some embodiments of the present disclosure, as a server automatically analyzes a request frame of a client based on a protocol stack, conventional protocol presetting can be eliminated.

Further, according to some embodiments of the present disclosure, a server can support various protocols by implementing a protocol stack in software on a server, and thus no additional hardware device is required. Accordingly, a system construction cost can be reduced.

Further, according to some embodiments of the present disclosure, one server can communicated with a plurality of clients using different protocols, such that no additional server for clients using different protocols is required.

DETAILED DESCRIPTION

Hereinafter, embodiments of the present disclosure will be described in detail with reference to the accompanying drawings.

As used herein, the term "protocol stack" refers to a memory area in which a plurality of protocols are stored. It is to be noted that a protocol may be stored on another only in one direction. For example, when a protocol A, a protocol B, and a protocol C are stored in this order, the protocol A is stored, then the protocol B is stored at an upper level of the protocol A, and the protocol C is stored at an upper level of the protocol B.

Likewise, the protocols may be read only in one direction. For example, when the protocol A is stored, the protocol B is stored at an upper level of the protocol A, and the protocol C is stored at an upper level of the protocol B, the protocol C is read first, the protocol B is read second, and the protocol A is finally read.

As used herein, the term "stack register" refers to a register pointing to the memory area at the highest level of a protocol stack. For example, when the protocol A is stored, the protocol B is stored at an upper level of the protocol A, and the protocol C is stored at an upper level of the protocol B, the stack register points to the memory area in which the protocol C is stored. When the protocol C is read out from the stack register, the stack register points to the memory area in which the protocol B is stored.

Figure 1:
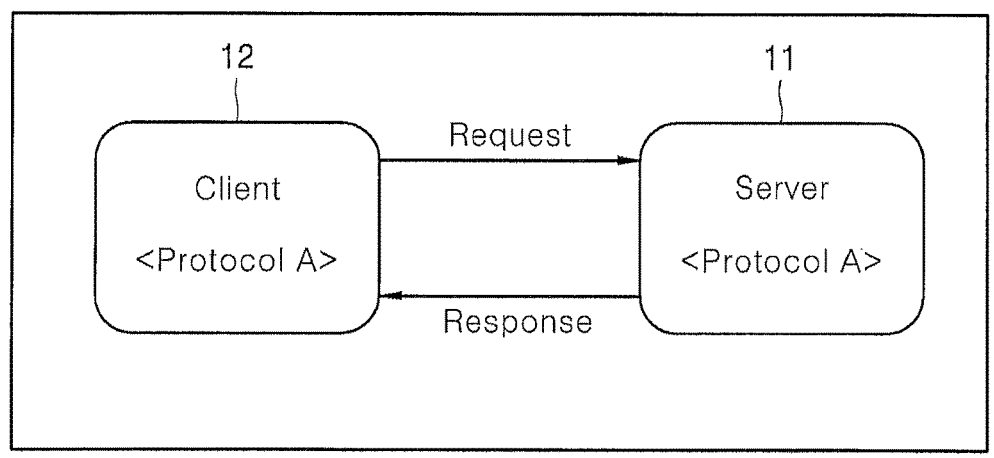
FIG. 1 is a block diagram illustrating a one-to-one communication structure of a server and a client.
Figure 2:
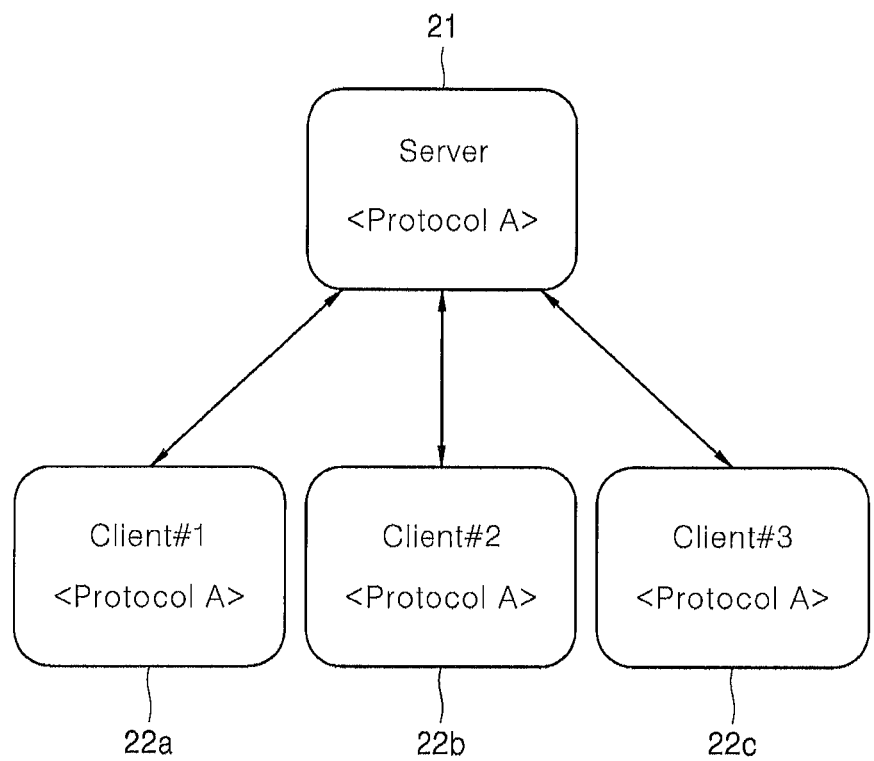
FIG. 2 is a block diagram illustrating a one-to-N communication structure of a server and a plurality of clients.
Figure 3:
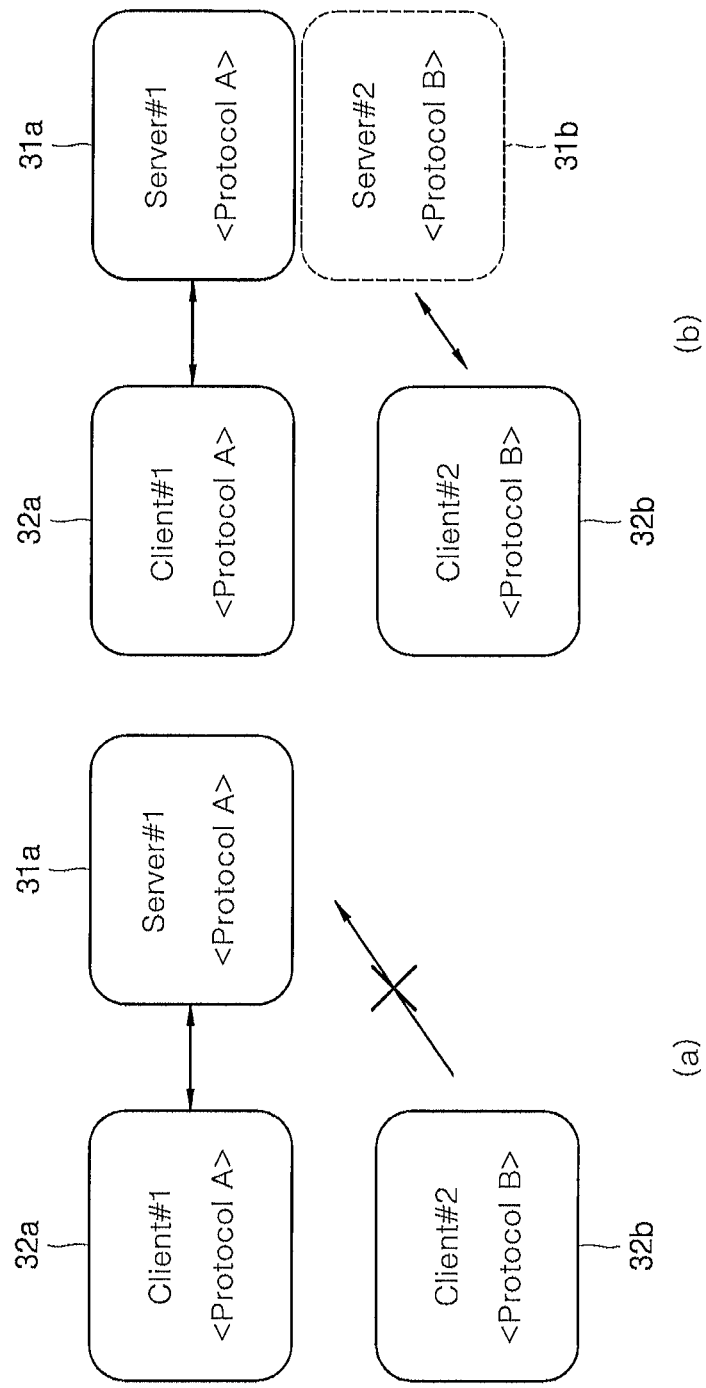
FIG. 3 is a block diagram illustrating a one-to-N communication structure of a server and a plurality of clients using different protocols.
Figure 4:
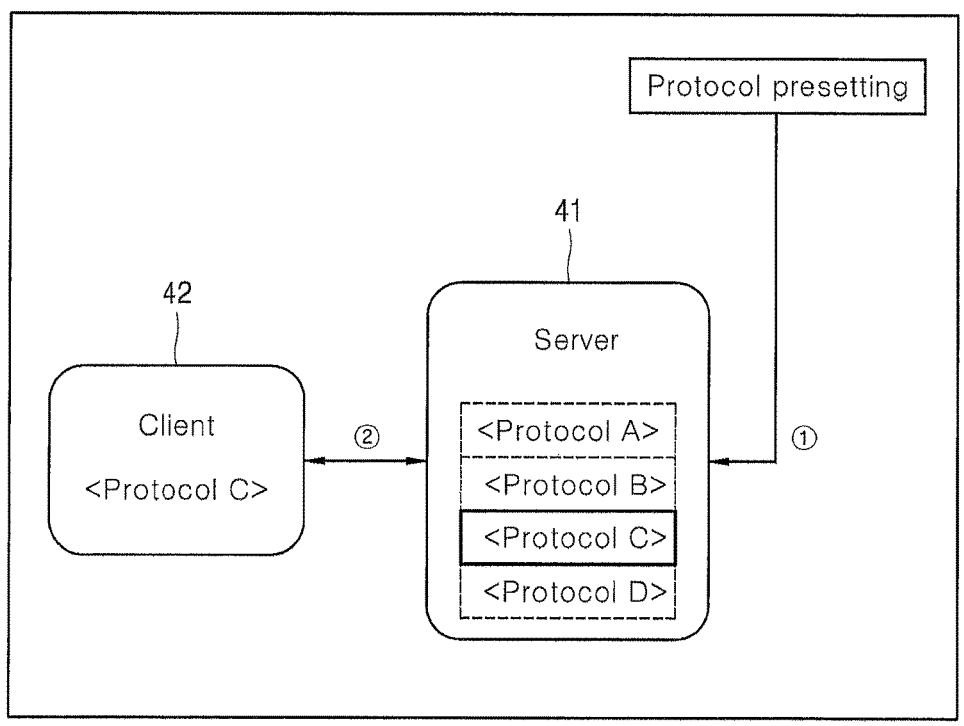
FIG. 4 is a block diagram illustrating a protocol presetting process.
Figure 5:
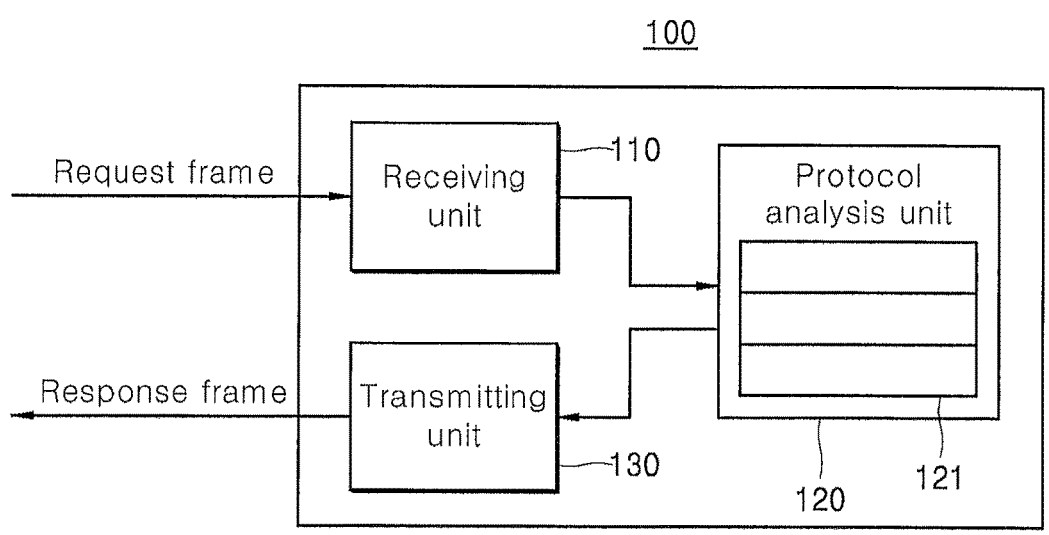
FIG. 5 is a block diagram illustrating an internal structure of a protocol automatic setting server according to an embodiment of the present disclosure.

FIG. 5 is a block diagram illustrating an internal structure of a protocol automatic setting server according to an embodiment of the present disclosure.

Referring to FIG. 5, a protocol automatic setting server 100 includes a receiving unit 110, a protocol analysis unit 120, and a transmitting unit 130.

The receiving unit 110 receives a request frame from a client and provides the request frame to the protocol analysis unit 120.

The protocol analysis unit 120 includes a protocol stack 121. At the protocol stack 121, a plurality of protocols is stored.

The protocol analysis unit 120 analyzes a protocol of the request frame received from the receiving unit 110 based on the protocol stored at the protocol stack 121 and provides a response frame corresponding to the request frame to the transmitting unit 130 according to an analysis result. Hereinafter, an execution process of the protocol analysis unit 120 will be described with reference to FIG. 6.

At the protocol stack 121, a plurality of protocols may be stored in specific order.

In an embodiment, at the protocol stack 121, protocols may be stored in order of protocols most frequently used by a client. For example, when a protocol A, a protocol B, and a protocol C are most frequently used in the above order by a client, at the protocol stack 121, the protocol C may be stored, at an upper level of the protocol C, the protocol B may be stored, and at an upper level of the protocol B, the protocol A may be stored.

As shown in FIG. 6A, the protocol analysis unit 120 reads the protocol A stored at a memory area in which a stack register indicates at the protocol stack 121 and determines whether the protocol A coincides with a protocol of a request frame. In this case, while reading the protocol A at the protocol stack 121, the stack register indicates a memory area at which the protocol B is stored, as shown in FIG. 6B.

If the protocol A read at the protocol stack 121 coincides with a protocol of a request frame, the protocol analysis unit 120 provides a response frame corresponding to the request frame to the transmitting unit 130 using the protocol A.

If the protocol A read at the protocol stack 121 does not coincide with a protocol of a request frame, the protocol analysis unit 120 reads the protocol B stored at a memory area in which the stack register indicates and determines whether the protocol B coincides with the protocol of the request frame, as shown in FIG. 6B. In this case, while reading the protocol B at the protocol stack 121, the stack register indicates a memory area at which the protocol C is stored, as shown in FIG. 6C.

If the protocol B read at the protocol stack 121 coincides with the protocol of the request frame, the protocol analysis unit 120 provides a response frame corresponding to the request frame to the transmitting unit 130 using the protocol B.

If the protocol B read at the protocol stack 121 does not coincide with the protocol of the request frame, the protocol analysis unit 120 reads the protocol C stored at a memory area in which the stack register indicates and determines whether the protocol C coincides with the protocol of the request frame, as shown in FIG. 6C. In this case, while the protocol C is read at the protocol stack 121, the protocol analysis unit 120 indicates a most final portion of the protocol stack 121, as shown in FIG. 6D.

If the protocol C read at the protocol stack 121 coincides with the protocol of the request frame, the protocol analysis unit 120 provides a response frame to the transmitting unit 130 using the protocol C.

If the protocol C read at the protocol stack 121 does not coincide with the protocol of the request frame, it means that a stored protocol does not exist at the protocol stack 121 and thus the protocol analysis unit 120 deletes a corresponding request frame. Accordingly, when the transmitting unit 130 receives a response frame corresponding to the request frame from the protocol analysis unit 120, the transmitting unit 130 provides the response frame to a client.

Figure 7:
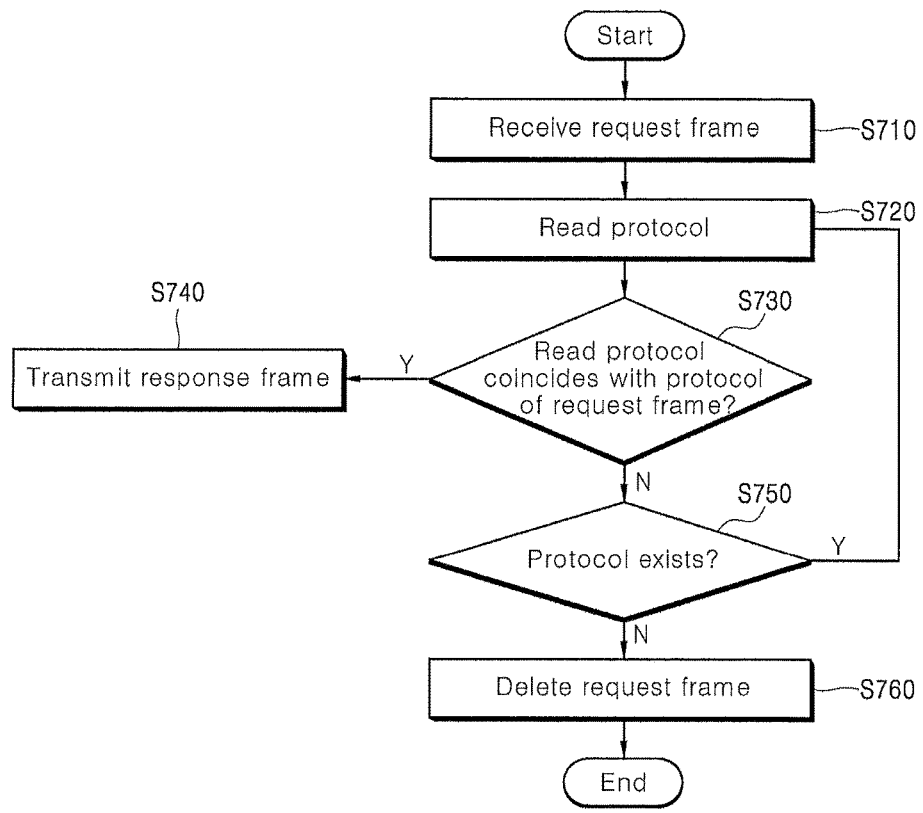
FIG. 7 is a flowchart illustrating a method of automatically setting a protocol according to an embodiment of the present disclosure.

FIG. 7 is a flowchart illustrating a method of automatically setting a protocol according to an embodiment of the present disclosure.

Referring to FIG. 7, the protocol automatic setting server 100 receives a request frame from a client (S710). The protocol automatic setting server 100 reads a protocol stored at a memory area in which a stack register indicates at a protocol stack (S720). The protocol automatic setting server 100 determines whether the protocol read at the protocol stack coincides with a protocol of a request frame (S730).

If the protocol read at the protocol stack coincides with a protocol of a request frame, the protocol automatic setting server 100 transmits a response frame corresponding to the request frame to the client using a corresponding protocol (S740).

If the protocol read at the protocol stack does not coincide with a protocol of a request frame, the protocol automatic setting server 100 determines whether a protocol exists at the protocol stack using a stack register (S750). If a protocol does not exist at the protocol stack using a stack register, the protocol automatic setting server 100 deletes the request frame (S760).

If a protocol exists at the protocol stack using a stack register, the process returns to step S720 and the protocol automatic setting server 100 repeatedly executes the process.

Figure 6:
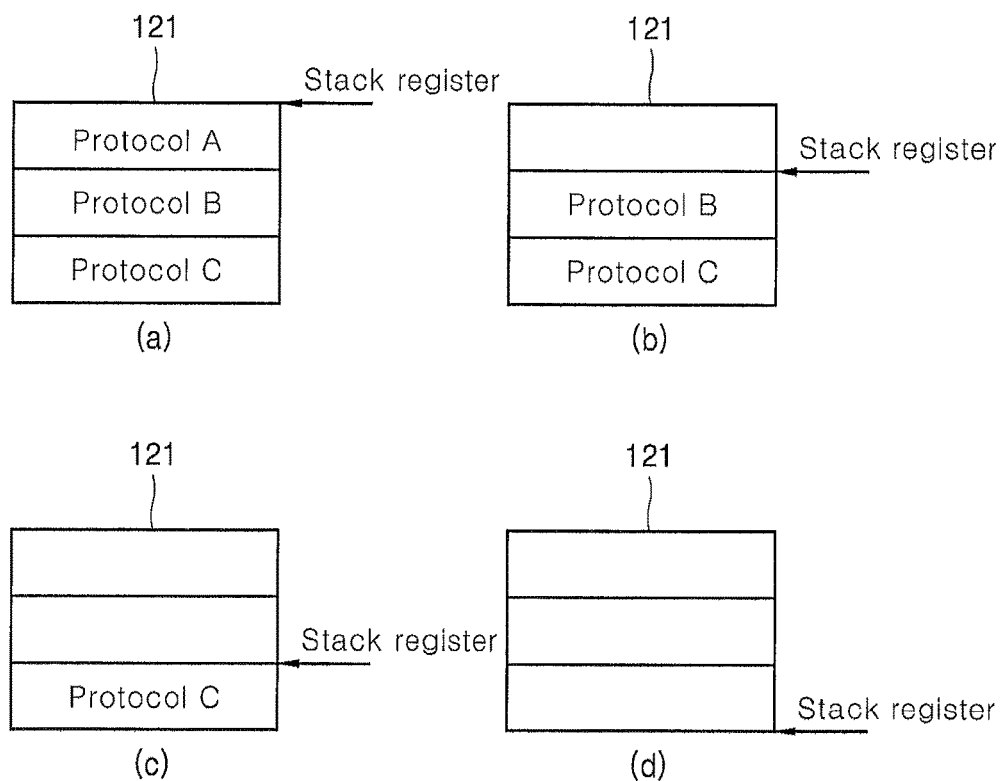
FIG. 6 is a diagram illustrating a process of analyzing a request frame, according to an embodiment of the present disclosure.
Figure 8:
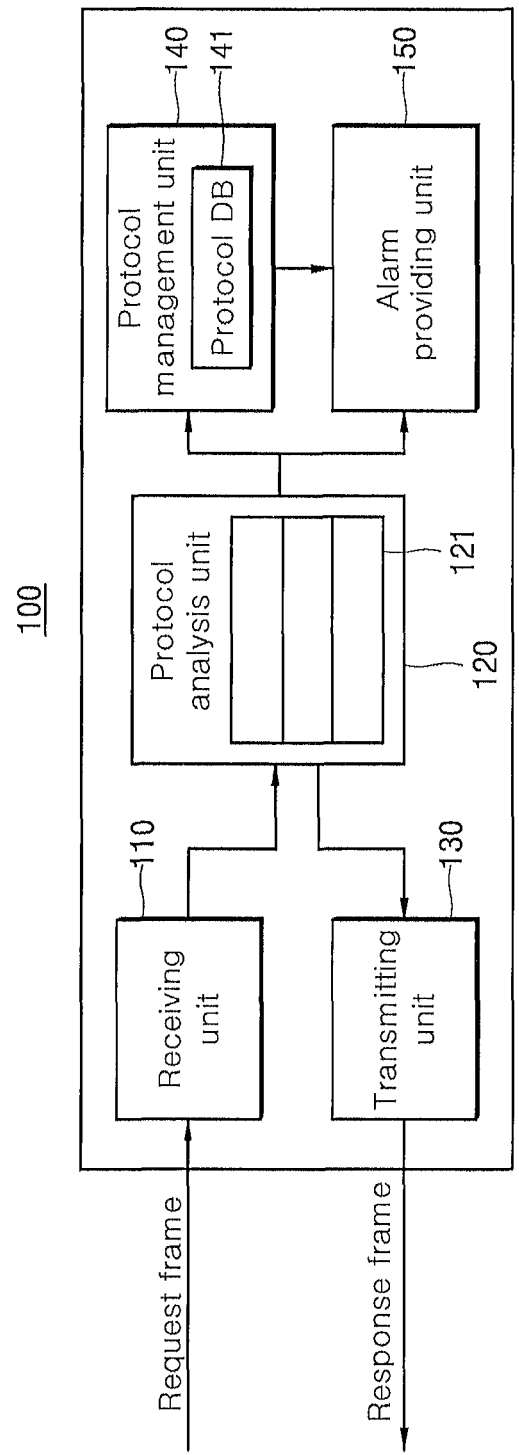
FIG. 8 is a block diagram illustrating an internal structure of a protocol automatic setting server according to another embodiment of the present disclosure.

FIG. 8 is a block diagram illustrating an internal structure of a protocol automatic setting server according to another embodiment of the present disclosure. In a configuration or operation of another embodiment of a protocol automatic setting server described with reference to FIG. 8, a configuration or operation identical to or corresponding to that described with reference to FIG. 6 is omitted, but another embodiment of FIG. 8 will be fully understood by a person of ordinary skill in the art from the configuration or operation.

Referring to FIG. 8, the protocol automatic setting server 100 may further include a protocol management unit 140 and an alarm providing unit 150, and the protocol management unit 140 may further include a protocol DB 141.

The protocol management unit 140 manages a protocol of a request frame that is not processed because a protocol corresponding to the request frame does not exist at the protocol stack 121 among request frames received from a client. For this reason, when a protocol corresponding to the request frame does not exist at the protocol stack 121, the protocol analysis unit 120 may provide alarm notifying that a request frame in which a protocol does not exist is received to a user through the alarm providing unit 150 and provide a protocol of a corresponding request frame to the protocol management unit 140.

When a protocol corresponding to the request frame is received from the protocol analysis unit 120, the protocol management unit 140 stores the received protocol at the protocol DB 141. In this case, if a protocol received from the protocol analysis unit 120, e.g., a protocol corresponding to the request frame does not exist at the protocol DB 141, the protocol management unit 140 adds the protocol to the protocol DB 141, and if a protocol received from the protocol analysis unit 120, e.g., a protocol corresponding to the request frame exists at the protocol DB 141, the protocol management unit 140 increases the request number of the previously stored protocol.

In this way, the reason why the protocol management unit 140 increases the request number of a protocol corresponding to the request frame is to suggest installation of a protocol that does not exist, but that has the many request number to a user by managing a request status on a protocol basis.

For this reason, if the request number of a protocol stored at the protocol DB 141 is larger than the specific number, the protocol management unit 140 may provide alarm notifying a request status of a corresponding protocol to the user through the alarm providing unit 150.

Therefore, by adjusting a source code of a protocol stack implemented in software to support a corresponding protocol, without any additional hardware device, a user can enable the protocol stack to support a corresponding protocol.

Figure 9:
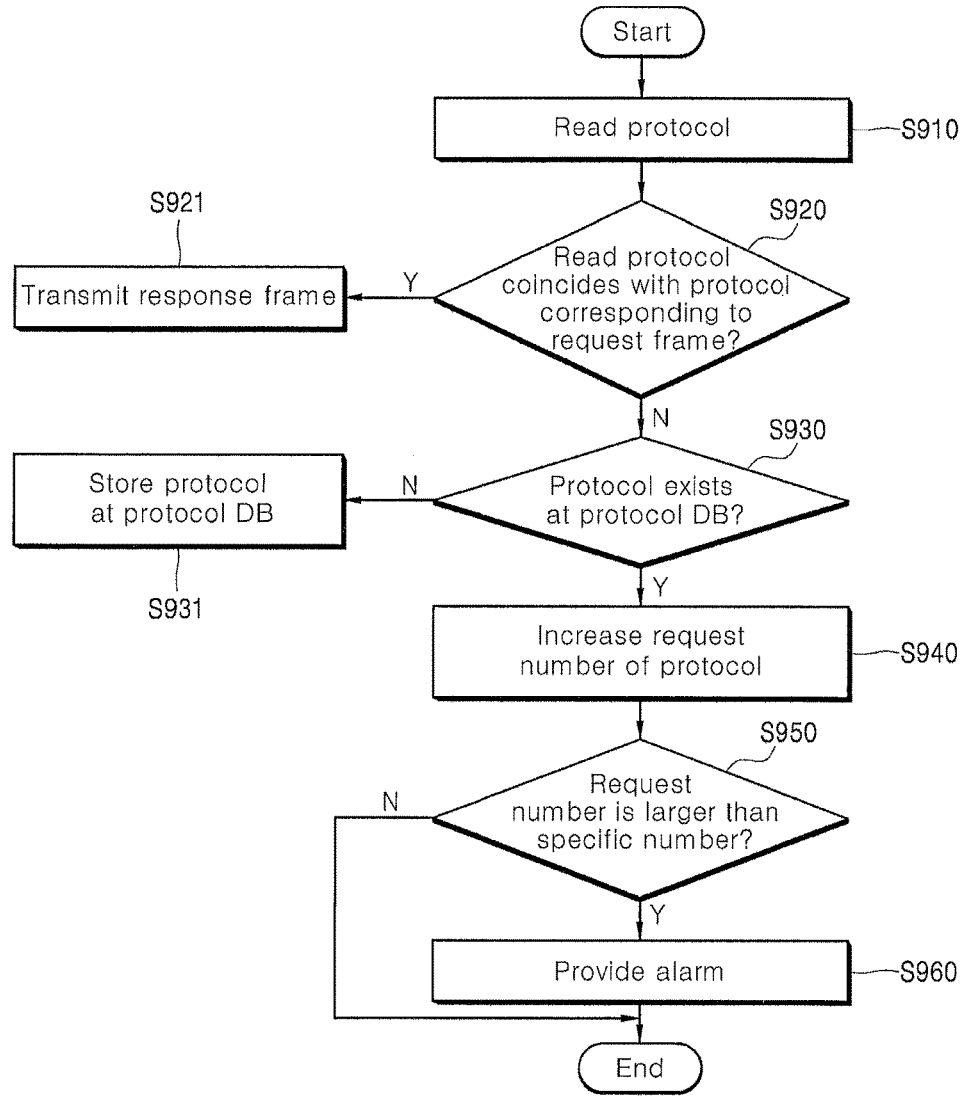
FIG. 9 is a flowchart illustrating a method of automatically setting a protocol according to another embodiment of the present disclosure.

FIG. 9 is a flowchart illustrating a method of automatically setting a protocol according to another embodiment of the present disclosure.

Referring to FIG. 9, when a protocol automatic setting server 100 receives a request frame from a client, the protocol automatic setting server 100 reads a protocol stored at a memory area in which a stack register indicates at a protocol stack (S910) and determines whether the protocol read at the protocol stack coincides with a protocol corresponding to the request frame (S920).

If the protocol read at the protocol stack coincides with a protocol corresponding to the request frame, the protocol automatic setting server 100 transmits a response frame corresponding to the request frame to a client using the corresponding protocol (S921). If the protocol read at the protocol stack does not coincide with a protocol corresponding to the request frame, the protocol automatic setting server 100 determines whether the protocol corresponding to the request frame exists at a protocol DB (S930).

If the protocol corresponding to the request frame does not exist at a protocol DB, the protocol automatic setting server 100 stores the protocol corresponding to the request frame at the protocol DB (S931).

If the protocol corresponding to the request frame exists at a protocol DB, the protocol automatic setting server 100 increases the request number of a protocol previously stored at the protocol DB, e.g., the protocol corresponding to the request frame (S940). In this way, the reason why the protocol automatic setting server 100 increases the request number of a previously stored protocol, e.g., a protocol corresponding to the request frame is to suggest installation of a protocol that does not exist but that has the many request number by managing a request status on a protocol basis to a user.

The protocol automatic setting server 100 determines whether the request number of a protocol stored at the protocol DB is larger than the specific number (S950).

If the request number of a protocol stored at the protocol DB is larger than the specific number, the protocol automatic setting server 100 may provide alarm notifying a request status of a corresponding protocol to a user (S960).

Therefore, by adjusting a source code of a protocol stack implemented in software to support a corresponding protocol, the user can enable the protocol stack to support the corresponding protocol without any additional hardware device.

According to some embodiments of the present disclosure, a protocol stack is implemented in software on a server to allow a server to support various protocols, such that no additional hardware device is required. Accordingly, system construction cost can be reduced. Further, according to some embodiments of the present disclosure, one server can communicate with a plurality of clients using different protocols, and thus no additional servers for supporting different protocols is required.

Thus far, although specific embodiments of the present disclosure have been described, various modifications may be made without departing from the scope of the present disclosure. Accordingly, the scope of the present disclosure is not construed as being limited to the above-described embodiments, but is defined by the following claims as well as equivalents thereof.

Although the present disclosure has been described with reference to the embodiments and the accompanying drawings, it is not limited to the above-described embodiments, but may be variously modified and altered from the above description by those skilled in the art. Therefore, the scope and spirit of the present disclosure should be defined only by the following claims, and all of the equivalences and equivalent modifications of the claims should be intended to fall within the scope and spirit of the present disclosure.

What is claimed is:

1. A method of automatically setting a protocol, performed in a server communicating with clients in a Programmable Logic Controller (PLC) system, the method comprising:
    receiving a request frame from a client;
    analyzing a protocol of the request frame based on one or more protocols in a protocol stack to determine a response frame for the request frame according to an analysis result, wherein the analyzing comprises:
        reading out the one or more protocols in the protocol stack; and
        determining whether the one or more protocols in the protocol stack coincide with the protocol of the request frame,
    determining whether the protocol of the request frame has been stored in a protocol database if the one or more protocols read out from the protocol stack do not coincide with the protocol of the request frame;
    storing the protocol of the request frame in the protocol database if the protocol of the request frame is not stored in the protocol database; and
    increasing a request number of the protocol of the request frame if the protocol of the request frame is stored in the protocol database.

2. The method of claim 1, further comprising transmitting the response frame for the request frame using one of the read one or more protocols if the one of the read one or more protocols coincides with the protocol of the request frame.

3. The method of claim 1, wherein the determining whether the read one or more protocols coincide with the protocol of the request frame comprises determining whether the protocol of the request frame exists in a memory area pointed by a stack register.

4. The method of claim 3, further comprising:
    reading out a protocol from the memory area pointed by the stack register if any protocol is present.

5. The method of claim 1, further comprising
    deleting the request frame if the read one or more protocols in the protocol stack do not coincide with the protocol of the request frame.

6. The method of claim 1, further comprising providing an alarm notifying a user of a current request status of the protocol of the request frame if the request number is above a predetermined number.

* * * * *